United States Patent
Kindo et al.

(10) Patent No.: US 11,568,509 B2
(45) Date of Patent: Jan. 31, 2023

(54) TRANSPORT REQUEST PROCESSING DEVICE, METHOD AND STORAGE MEDIUM

(71) Applicant: TOYOTA JIDOSHA KABUSHIKI KAISHA, Toyota (JP)

(72) Inventors: Toshiki Kindo, Yokohama (JP); Yuji Suzuki, Toyota (JP); Mutsumi Matsuura, Okazaki (JP); Tomoaki Miyazawa, Nagoya (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/918,255

(22) Filed: Jul. 1, 2020

(65) Prior Publication Data

US 2021/0027411 A1    Jan. 28, 2021

(30) Foreign Application Priority Data

Jul. 23, 2019 (JP) .............................. JP2019-135360

(51) Int. Cl.
| G06Q 50/30 | (2012.01) |
| G06Q 50/26 | (2012.01) |
| G06Q 10/06 | (2012.01) |
| B60W 60/00 | (2020.01) |

(52) U.S. Cl.
CPC ....... *G06Q 50/30* (2013.01); *G06Q 10/06311* (2013.01); *G06Q 50/265* (2013.01); *B60W 60/00253* (2020.02)

(58) Field of Classification Search
None
See application file for complete search history.

(56) References Cited

U.S. PATENT DOCUMENTS

| 10,304,027 | B1* | 5/2019 | Haque | G06Q 50/30 |
| 11,238,380 | B1* | 2/2022 | Perry | G06Q 10/063116 |
| 2007/0225993 | A1* | 9/2007 | Moore | G06Q 50/26 |
| | | | | 705/5 |
| 2015/0197007 | A1* | 7/2015 | Pack | B25J 9/161 |
| | | | | 701/2 |
| 2018/0081374 | A1* | 3/2018 | Nimchuk | G06Q 10/02 |
| 2019/0019128 | A1* | 1/2019 | Fox, Jr. | G06Q 10/06313 |
| 2020/0202646 | A1* | 6/2020 | Ammoura | G07C 9/00309 |

FOREIGN PATENT DOCUMENTS

JP    2006-301723 A    11/2006

\* cited by examiner

*Primary Examiner* — Alan Torrico-Lopez
(74) *Attorney, Agent, or Firm* — Oliff PLC

(57) ABSTRACT

A transportation request processing device includes: a memory; and a processor coupled to the memory, and configured to: receive, from a terminal of an orderer, a transportation request to transport a target person or object to a destination by a vehicle traveling by remote driving and to deliver the target person or object to a recipient, divide a task corresponding to the transportation request into a remote driving task of causing the vehicle to travel by remote driving, and a safety check task of checking a periphery of the vehicle when delivering the target person or object to the recipient at the destination, and transmit information of the remote driving task to a first terminal of a first contractor who will undertake the remote driving task, and transmit information of the safety check task to a second terminal of a second contractor who will undertake the safety check task.

12 Claims, 4 Drawing Sheets

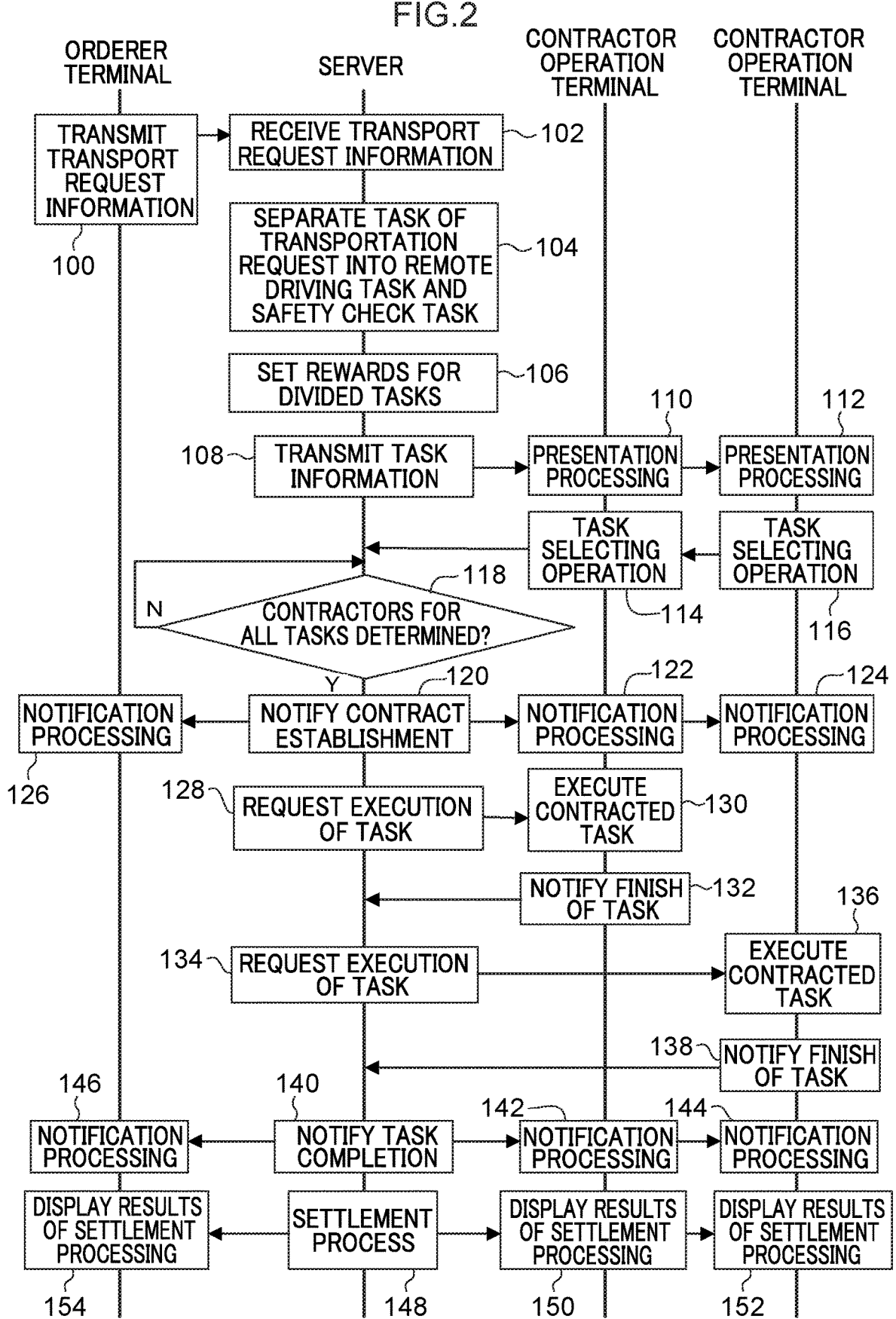

FIG.3

(1) TASK CORRESPONDING TO TRANSPORTATION REQUEST OF "TRANSPORTING OBJECT D FROM POINT A TO POINT C AND DELIVERING OBJECT AT POINT C"

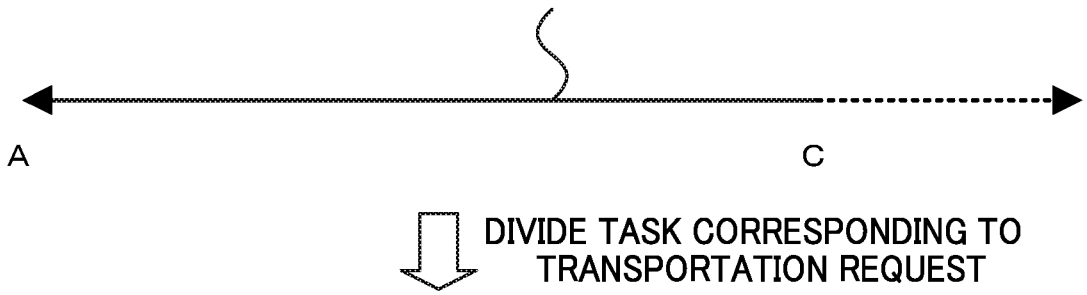

⇩ DIVIDE TASK CORRESPONDING TO TRANSPORTATION REQUEST (2) REMOTE DRIVING TASK OF "TRANSPORTING OBJECT D BY REMOTE DRIVING FROM POINT A TO POINT C"   SAFETY CHECK TASK OF "DELIVERING OBJECT D AT POINT C"

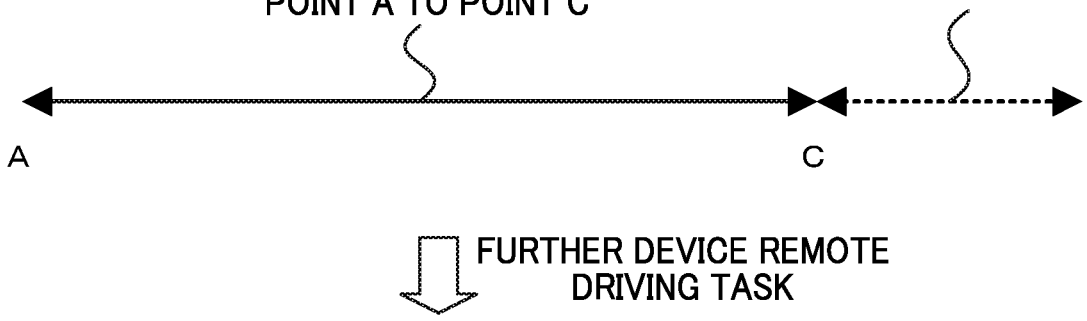

⇩ FURTHER DEVICE REMOTE DRIVING TASK (3) REMOTE DRIVING TASK 1 OF "TRANSPORTING OBJECT D BY REMOTE DRIVING FROM POINT A TO POINT B"   REMOTE DRIVING TASK 2 OF "TRANSPORTING OBJECT D BY REMOTE DRIVING FROM POINT B TO POINT C"   SAFETY CHECK TASK OF "DELIVERING OBJECT D AT POINT C"

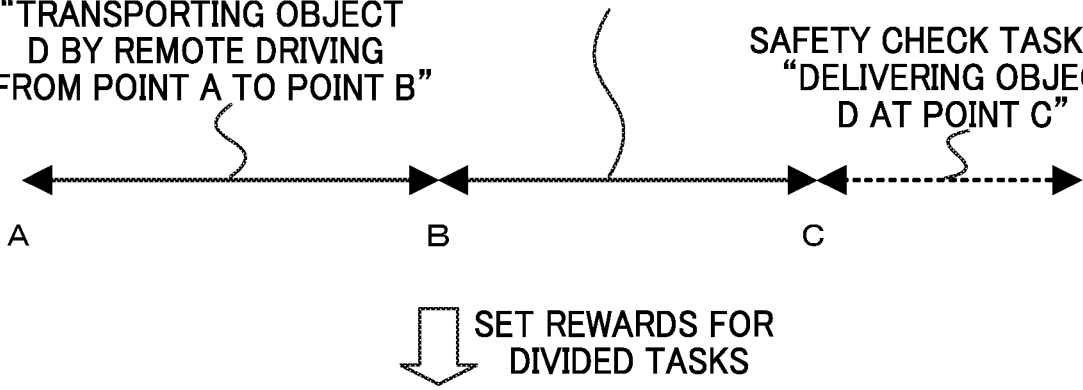

⇩ SET REWARDS FOR DIVIDED TASKS (4) REMOTE DRIVING TASKS 1 AND 2: STANDARD REWARD AMOUNT − A/2
SAFETY CHECK TASK: STANDARD REWARD AMOUNT + A

FIG.4

| TYPE OF TASK | RESTRAINT TIME | REWARD | CONTENT OF TASK | |
|---|---|---|---|---|
| REMOTE DRIVING TASK | t1 - t2 | @E | REMOTE DRIVING FROM POINT A TO POINT B | CONTRACT ~60 |
| REMOTE DRIVING TASK | t2 - t3 | @E | REMOTE DRIVING FROM POINT B TO POINT C | CONTRACT ~60 |
| SAFETY CHECK TASK | t3 - | @F | DELIVERING OBJECT D AT POINT C | CONTRACT ~60 |

TRANSPORT REQUEST PROCESSING DEVICE, METHOD AND STORAGE MEDIUM

CROSS-REFERENCE TO RELATED APPLICATION

This application is based on and claims priority under 35 USC 119 from Japanese Patent Application No. 2019-135360 filed on Jul. 23, 2019, the disclosure of which is incorporated by reference herein.

BACKGROUND

Technical Field

The present disclosure relates to a transport request processing device, transport request processing method and a storage medium.

Related Art

Japanese Patent Application Laid-Open No. 2006-301723 discloses a technique whereby a state of an operator is obtained while an operator is operating a vehicle on behalf of a user of the vehicle, and in a case in which it is determined that the operator cannot continue operation of the vehicle, operation of the vehicle is switched to another operator.

While remote driving of a vehicle becomes possible, it would be conceivable to receive a transport request from an orderer to transport a target person or a target object to a destination by a remotely driven vehicle for delivery to a recipient, and to have a task corresponding to the received transport request executed by a contractor. Here, the task corresponding to the above-mentioned transportation request would be completed after the target person or the target object has arrived at the destination, and when the recipient has appeared at the destination, by checking the surroundings of the vehicle and delivering the target person or the target object to the recipient. However, when the recipient does not appear at the destination, the contractor needs to wait until the recipient appears at the destination, and during this time, the contractor is restrained and the burden on the contractor is large. Further, when no contractor who will undertake the task corresponding to the requested transport request is found, the request of the orderer may not be satisfied.

SUMMARY

The present disclosure has been made in view of the foregoing circumstances, and provides a transportation request processing device, transportation request processing method and a storage medium that may reduce the possibility that a transportation request from an orderer will not be satisfied.

A first aspect of the present disclosure is a transportation request processing device, including: a receiver unit that receives, from a terminal of an orderer, a transportation request to transport a target person or a target object to a destination by a vehicle traveling by remote driving and to deliver the target person or the target object to a recipient, a division unit that divides a task corresponding to the transportation request into a remote driving task of causing the vehicle to travel by remote driving, and a safety check task of checking a periphery of the vehicle when delivering the target person or the target object to the recipient at the destination, and transmitter unit that transmits information of the remote driving task to a first terminal of a first contractor who will undertake the remote driving task, and transmits information of the safety check task to a second terminal of a second contractor who will undertake the safety check task.

In this aspect, the safety check task is divided from the task corresponding to the transportation request requested by the orderer, and the information of the safety check task is transmitted to the second contractor, whereby the possibility of the safety check task being executed by the second contractor may be improved. Thereby, the possibility that the transportation request from the orderer will not be satisfied may be reduced.

In this aspect, the division unit may set a reward for the first contractor and a reward for the second contractor such that the reward for the second contractor who will undertake the safety check task is higher, and the transmitter unit may transmit the rewards set by the division unit to the first terminal and to the second terminal.

In the above-described configuration, since the reward for the second contractor who will undertake the safety check task is set to be higher, the possibility that the safety check task will be executed by the second contractor may be further improved.

In the present aspect, the division unit divides the remote driving task into plural tasks in a case in which the required time for the remote driving task is equal to or longer than a predetermined time, or in a case in which the travel distance of the remote driving task is equal to or longer than a predetermined distance.

In the above-described configuration, if the remote driving task is long—specifically, if the required time is longer than a predetermined time or if the travel distance is longer than a predetermined distance—the remote driving task is divided into plural tasks. Therefore, since each individual remote driving task after division has an appropriate length, the likelihood that the remote driving task will be performed by a first contractor may be increased.

A second aspect of the present disclosure is a method of processing a transportation request, the method including: receiving, from a terminal of an orderer, a transportation request to transport a target person or a target object to a destination by a vehicle traveling by remote driving and to deliver the target person or the target object to a recipient; dividing a task corresponding to the transportation request into a remote driving task of causing the vehicle to travel by remote driving, and a safety check task of checking a periphery of the vehicle when delivering the target person or the target object to the recipient at the destination; and transmitting information of the remote driving task to a first terminal of a first contractor who will undertake the remote driving task and transmitting information of the safety check task to a second terminal of a second contractor who will undertake the safety check task.

The second aspect may further include: setting a reward for the first contractor and a reward for the second contractor such that the reward for the second contractor who will undertake the safety check task is higher, and transmitting the set rewards to the first terminal and to the second terminal.

The second aspect may further include dividing the remote driving task into plural tasks in a case in which the required time for the remote driving task is equal to or longer than a predetermined time, or in a case in which the travel distance of the remote driving task is equal to or longer than a predetermined distance.

A third aspect of the present disclosure is a non-transitory recording medium storing a program that causes a computer to execute transportation request processing, the transportation request processing including: receiving, from a terminal of an orderer, a transportation request to transport a target person or a target object to a destination by a vehicle traveling by remote driving and to deliver the target person or the target object to a recipient; dividing a task corresponding to the transportation request into a remote driving task of causing the vehicle to travel by remote driving, and a safety check task of checking a periphery of the vehicle when delivering the target person or the target object to the recipient at the destination; and transmitting information of the remote driving task to a first terminal of a first contractor who will undertake the remote driving task and transmitting information of the safety check task to a second terminal of a second contractor who will undertake the safety check task.

The third aspect may further include: setting a reward for the first contractor and a reward for the second contractor such that the reward for the second contractor who will undertake the safety check task is higher, and transmitting the set rewards to the first terminal and to the second terminal.

The third aspect may further include dividing the remote driving task into plural tasks in a case in which the required time for the remote driving task is equal to or longer than a predetermined time, or in a case in which the travel distance of the remote driving task is equal to or longer than a predetermined distance.

According to the aspects of the present disclosure, it is possible to reduce the possibility that a transportation request from an orderer will not be satisfied.

BRIEF DESCRIPTION OF THE DRAWINGS

FIG. 2 is a sequence diagram illustrating a processing sequence according to the embodiment.

FIG. 3 is an image diagram for explaining task division and reward settings.

FIG. 4 is an image diagram illustrating an example of a presentation screen displayed on the display unit of the contractor terminal.

DETAILED DESCRIPTION

Figure 1:
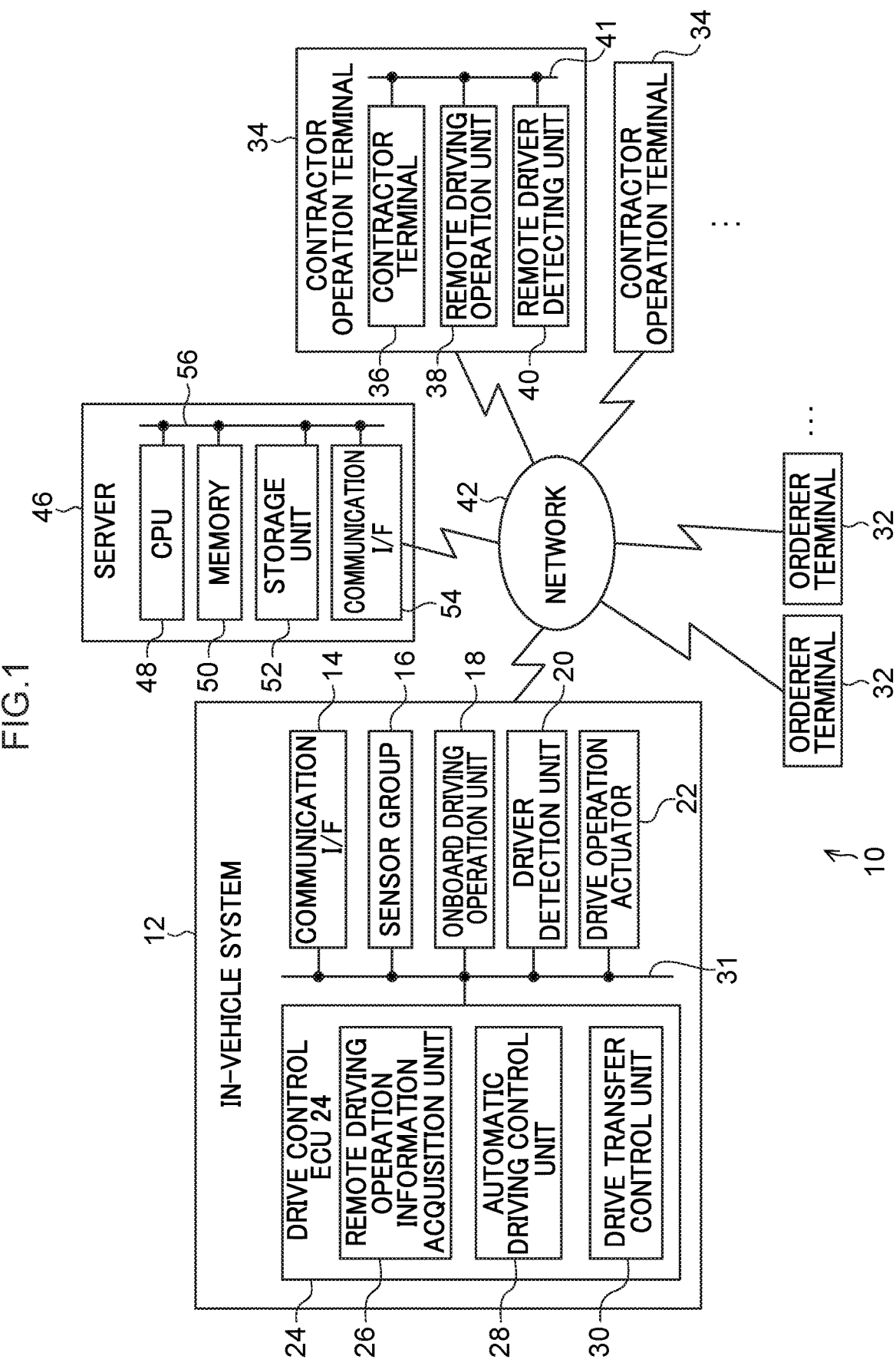
FIG. 1 is a block diagram illustrating a schematic configuration of a transport request processing system according to an embodiment.

Herebelow, an example of an embodiment of the present disclosure is described in detail with reference to the attached drawings. As illustrated in FIG. 1, the transport request processing system 10 according to the embodiment includes an in-vehicle system 12 mounted on a vehicle, a plurality of orderer terminals 32, a plurality of contractor operation terminals 34, and a server 46. The in-vehicle system 12, the orderer terminal 32, the contractor operation terminal 34, and the server 46 are communicably connected via a network 42.

The vehicle equipped with the vehicle-mounted system 12 is provided with an onboard driving mode, a remote driving mode, and an automatic driving mode as driving modes for driving the vehicle. The onboard driving mode is a mode in which the driver riding the vehicle operates the onboard driving operation unit 18 described later to drive the vehicle. The remote driving mode is a mode in which a remote driver outside the vehicle operates a remote driving operation unit 38, which will be described later, of the contractor operation terminal 34, to remotely drive the vehicle. The automatic driving mode is a mode in which the automatic driving control unit 28 described later automatically drives (runs) the vehicle.

The in-vehicle system 12 includes a communication I/F (Inter Face) 14, a sensor group 16, an onboard driving operation unit 18, a driver detection unit 20, a drive operation ACT (Actuator) 22, and a drive control ECU (Electronic Control Unit) 24, which are connected to each other via a bus 31.

The communication I/F 14 of the in-vehicle system 12 communicates with the contractor operation terminal 34 and the server 46 via the network 42. The sensor group 16 includes a plurality of types of sensors that acquire information indicating the state of the surrounding environment of the vehicle. The surrounding environment of the vehicle acquired by the sensor group 16 is used for automatic driving control and the like by an automatic driving control unit 28 described later. Examples of the sensors included in the sensor group 16 are a GNSS (Global Navigation Satellite System) device, an in-vehicle communication device, a navigation system, a radar device, and a camera.

The GNSS device receives GNSS signals from plural GNSS satellites, and measures the position of the own vehicle. The accuracy of measurement improves in accordance with an increase in the number of GNSS signals that the GNSS device can receive. The onboard communicator is a communication device that carries out at least one of inter-vehicle communications with other vehicles via the communication I/F 14 and road-vehicle communications with roadside devices. The navigation system includes a map information storage unit that stores map information. The navigation system displays the position of the vehicle on a map and guides a route to a destination based on the position information obtained from the GNSS device and the map information stored in the map information storage unit.

The radar device includes plural radars whose detection ranges differ from one another. The radar device detects objects such as pedestrians and other vehicles and the like that exist at the periphery of the own vehicle, and acquires relative positions and relative speeds between the detected objects and the own vehicle. Further, the radar device incorporates therein a processing device that processes the results of detecting objects at the periphery. On the basis of changes in the relative positions and the relative speeds between the own vehicle and individual objects that are included in recent, plural results of detection, and the like, this processing device excludes noise, roadside objects such as guard rails and the like, from objects of monitoring, and tracks and monitors specific objects, such as pedestrians and other vehicles and the like, as objects of monitoring. Further, the radar device outputs information of the relative positions and the relative speeds between the own vehicle and the individual objects of monitoring, and the like. The camera captures images of the periphery of the own vehicle by plural cameras, and outputs the captured images.

The onboard driving operation unit 18 includes a throttle pedal, a brake pedal, a steering wheel, and a display unit provided on a vehicle on which the vehicle-mounted system 12 is mounted. The onboard driving operation section 18 is operated by a driver riding in the vehicle when the vehicle is in the onboard driving mode. Further, the onboard driving operation section 18 includes a sensor for detecting the operation amount of each of the throttle pedal, the brake pedal, and the steering wheel, and outputs the operation amount of each pedal and the steering wheel by the driver as the onboard driving operation information.

The driver detection unit 20 detects the state of the driver operating the onboard driving operation unit 18. The driver's state detected by the driver detecting unit 20 includes, for example, the driver's biological information such as the driver's pulse and blood pressure, the driver's posture such as whether or not the driver is holding the steering wheel of the onboard driving operation unit 18, and the driver's operation force such as the steering force at which the driver operates the steering wheel of the onboard driving operation unit 18, and the like. In addition, the driver detection unit 20 determines the presence or absence of an abnormality of the driver by comparing the result of detecting the state of the driver with a threshold value, and outputs an abnormality detection signal when abnormality of the driver is detected.

The driving operation ACT 22 includes a throttle ACT for changing a throttle opening amount of the own vehicle, a brake ACT for changing a braking force generated by a braking device of the own vehicle, and a steering ACT for changing a steering amount by a steering device of the own vehicle. The driving operation ACT 22 includes a door opening/closing ACT for opening/closing a vehicle door and a trunk opening/closing ACT for opening/closing a vehicle trunk.

The drive control ECU 24 includes a CPU (Central Processing Unit), a memory such as a ROM (Read Only Memory) and a RAM (Random Access Memory), a non-volatile storage unit such as an HDD (Hard Disk Drive) and an SSD (Solid State Drive) and a communication I/F. The drive control ECU 24 reads out a predetermined program stored in the storage unit into the memory and executes the program by the CPU, thereby functioning as the remote driving operation information acquisition unit 26, the automatic driving control unit 28, and the drive transfer control unit 30.

When the vehicle is in the remote driving mode, the remote driving operation information obtaining unit 26 obtains remote driving operation information indicating an operation amount by the remote driver of a remote driving operation unit 38, described later, of the contractor operation terminal 34.

When the vehicle is in the automatic driving mode, the automatic driving control unit 28 performs an automatic driving control process for automatically running the vehicle by generating and outputting automatic driving control information for controlling the operation of each ACT of the driving operation ACT 22, based on information obtained by a plurality of types of sensors of the sensor group 16 and indicating the state of the surrounding environment of the vehicle.

When the vehicle is in the on-board driving mode, the drive transfer control unit 30 supplies the on-board driving operation information output from the on-board driving operation unit 18 to the driving operation ACT 22 to activate each of the ACTs of the driving operation ACT 22 in accordance with the operation of the on-board driving operation unit 18 by the driver. In this case, the vehicle travels in accordance with the operation of the onboard driving operation unit 18 by the driver riding in the vehicle.

When the vehicle is in the remote driving mode, the drive transfer control unit 30 supplies the remote driving operation information acquired by the remote driving operation information acquisition unit 26 to the driving operation ACT 22, thereby activating each ACT of the driving operation ACT 22 in accordance with the operation of the remote driving operation unit 38 by the remote driver. In this case, the vehicle travels in accordance with the operation of the remote driving operation unit 38 by the remote driver.

In addition, when the vehicle is in the automatic driving mode, the drive transfer control unit 30 supplies the automatic driving control information output from the automatic driving control unit 28 to the driving operation ACT 22, thereby activating each ACT of the driving operation ACT 22 in accordance with the automatic driving control of the automatic driving control unit 28. In this case, the vehicle travels according to the automatic driving control by the automatic driving control unit 28.

Further, the drive transfer control unit 30 controls the transfer of the driving of the vehicle by switching the driving mode of the vehicle as needed. The switching of the driving mode of the vehicle is performed, for example, when the remote driving of the vehicle is transferred from the remote driver A to the remote driver B in a state in which the vehicle is traveling by remote driving by the remote driver A, and may be a case of switching to the remote operation mode in which the remote driver B remotely drives after temporarily switching from the remote operation mode in which the remote driver A remotely drives to the automatic operation mode.

The orderer terminal 32 is a terminal operated by the orderer. The orderer terminal 32 includes a CPU, memories such as a ROM and a RAM, nonvolatile storage units such as an HDD and an SSD, and a communication I/F. A display unit such as a display and an input unit such as a keyboard and a mouse are provided. In the present embodiment, the orderer orders a transport request that transports the target person or the target object to the destination by a remotely driven vehicle via the orderer terminal 32, and delivers the target person or the target object, which has been transported to the destination, to the recipient. In the present embodiment, the orderer may be the owner of the vehicle on which the in-vehicle system 12 is mounted, or may not be the owner of the vehicle.

The contractor operation terminal 34 is a terminal operated by a contractor who undertakes a task corresponding to a transportation request ordered by the orderer. The contractor operation terminal 34 includes a contractor terminal 36, a remote driving operation unit 38, and a remote driver detecting unit 40, which are connected to each other via a bus 41. The remote driving operation unit 38 and the remote driver detection unit 40 may be omitted from the contractor operation terminal 34 operated by a contractor who performs a safety confirmation task described later. The contractor terminal 36 includes a CPU, memories such as a ROM and a RAM, nonvolatile storage units such as an HDD and an SSD, and a communication I/F. A display unit such as a display and an input unit such as a keyboard and a mouse are provided.

The remote driving operation unit 38 includes a throttle pedal, a brake pedal, a steering wheel, a door open/close switch, a trunk open/close switch, and a display unit. On the display unit, an image representing a situation around the vehicle captured by a camera included in the sensor group 16 of the in-vehicle system 12 is displayed. The remote operator (contractor) operates the throttle pedal, the brake pedal, and the steering wheel of the remote driving operation unit 38 when the vehicle in the remote operation mode is remotely driven by the remote operator. Further, the remote driving operation unit 38 includes a sensor that detects an operation amount of each of a throttle pedal, a brake pedal, and a steering wheel. The remote driving operation unit 38 transmits the operation amount of each pedal and the steering wheel by the remote driver to the in-vehicle system 12 as remote driving operation information.

The remote driver detecting unit 40 detects the state of the remote driver operating the remote driving operation unit 38, for example, the biological information of the remote driver, the posture of the remote driver, the operating force of the remote driver, and the like, in the same manner as the driver detection unit 20. In addition, the remote driver detecting unit 40 determines the presence or absence of an abnormality of the remote driver by comparing the results of detecting the state of the remote driver with a threshold value, and outputs an abnormality detection signal when abnormality of the remote driver is detected.

The server 46 includes a CPU 48, a memory 50 such as a ROM or a RAM, a non-volatile storage unit 52 such as an HDD or an SSD, and a communication I/F 54 (corresponding to a receiving unit and a transmitting unit) that communicates with an external device. The CPU 48, the memory 50, the storage unit 52, and the communication I/F 54 are connected to each other via a bus 56. The server 46 functions as a division unit by reading a predetermined program stored in the storage unit 52 into the memory 50 and executing the program by the CPU 48, and performs processing described later. The server 46 is an example of a transport request processing device.

Next, a processing sequence according to the embodiment will be described with reference to FIG. 2. The orderer transports the target person or the target object to the destination by a vehicle traveling by remote driving, and when wishing to order a transport request to deliver the transported target person or the target object to the destination, the orderer terminal 32 is operated and transportation request information indicating the contents of the transportation request to be ordered is input. The transport request information includes information on the starting point and destination for transporting the target person or the object, information indicating whether the transport target is a person or an object, and information regarding a consideration or the like for the contractor who undertakes the task corresponding to the transport request.

When the input of the transport request information is completed, the orderer instructs transmission of the transport request information. Thereby, the orderer terminal 32 transmits the transport request information (see also step 100 in FIG. 2), and the transport request information transmitted from the orderer terminal 32 is received by the server 46 (see also step 102 in FIG. 2), whereby a transport request is placed by the orderer. Step 102 is an example of processing by the receiving unit.

The server 46 recognizes the task corresponding to the transportation request corresponding to the transportation request information by referring to the received transportation request information. The task corresponding to the transportation request is, for example, recognized by the server 46 as a task of "transporting the object D from the point A to the point C and delivering the object at the point C" as shown in (1) of FIG. 3.

Next, the server 46 separates the task corresponding to the recognized transportation request into a remote driving task for driving the vehicle by remote driving, and a safety check task including checking the periphery of the vehicle when the target person or the target object is delivered to the recipient at the destination (see also step 104 in FIG. 2). For example, the task shown in (1) of FIG. 3 is divided, by the server 46, into a remote driving task of "transporting the object D by remote driving from the point A to the point C" and a safety check task of "delivering the object D at the point C", as shown in (2) of FIG. 3. This processing is an example of processing by the division unit.

To undertake the remote operation task, a license for remotely operating the vehicle is required, but to undertake the safety check task, no remote operation license is required. As described above, by dividing the task corresponding to the transportation request into the remote operation task and the safety confirmation task, it is possible to improve the possibility that a contractor who undertakes the safety confirmation task appears.

Further, the server 46 further divides the remote driving task into a plurality of remote driving tasks when the required time of the divided remote driving task is equal to or longer than a predetermined time or when the traveling distance of the divided remote driving task is equal to or longer than a predetermined distance. For example, the remote driving task shown in (2) of FIG. 3 is divided by the server 46 into a remote driving task 1 of "transporting the object D by remote driving from the point A to the point B" and a remote driving task 2 of "transporting the object D by remote driving from the point B to the point C", as shown in (3) of FIG. 3. This processing is also an example of processing by the division unit.

Thus, when the required time of the remote driving task is equal to or longer than a predetermined time, or when the traveling distance of the remote driving task is equal to or longer than a predetermined distance, it is divided such that each remote driving task has an appropriate length. Therefore, it is possible to improve the possibility that a contractor who performs the remote driving task appears.

Subsequently, the server 46 sets the reward for each of the divided tasks so that the reward for the safety confirmation task is higher (see also step 106 in FIG. 2). In the example shown in (4) of FIG. 3, the reward of the safety confirmation task is set to an amount obtained by adding a predetermined amount α to the standard amount of reward, whereas the reward of the remote driving tasks 1 and 2 is set to an amount obtained by subtracting the predetermined amount α/2 from the standard reward amount. Note that the standard reward amount is set to an amount that is funded by a consideration for a task corresponding to the transportation request input by the orderer. The processing of step 106 is also an example of processing by the division unit.

Next, the server 46 transmits information on each task divided from the task corresponding to the transportation request to the plurality of contractor operation terminals 34 (see also step 108 in FIG. 2). Step 108 is an example of processing by the transmission unit. Then, the plurality of contractor operation terminals 34 that have received the information of the individual tasks from the server 46 perform presentation processing such as displaying the received information on the display unit of the contractor terminal 36 (see also steps 110, 112 in FIG. 2). FIG. 4 shows an example of a presentation screen displayed on the display unit by the presentation process. On the presentation screen shown in FIG. 4, for each task, the type of the task, the restraint time (time), the reward, and the content of the task are each displayed, and a button 60 for operating when the task is undertaken is also displayed.

The contractor operating the individual contractor operation terminal 34, by referring to the presentation screen displayed on the display unit, grasps the contents of the individual tasks, the restraint time, the reward, and the like, and considers whether or not to undertake the individual tasks. Then, when the contractor decides to undertake any task, the contractor performs a task selecting operation of operating the button 60 corresponding to the task that he or she has decided to undertake (see also steps 114 and 116 in FIG. 2). When a task selection operation is performed by a contractor at a certain contractor operation terminal 34, information on the selected task and information on the contractor who performed the task selection operation are transmitted from the contractor operation terminal 34 to the server 46.

Each time the server 46 receives the information from the contractor operation terminal 34, the server 46 determines whether or not the contractor to undertake the task has been determined for all the tasks (see also step 118 in FIG. 2). When a task for which the contractor has not been determined remains, the server 46 performs processing such as removing the button 60 corresponding to the tasks for which the contractor has been determined from the presentation screen displayed on the display unit of each contractor operation terminal 34.

When the contractors have been determined for all the tasks, the server 46 notifies the individual contractor operation terminals 34 operated by the contractors who will undertake the current individual tasks, and the orderer terminal 32 that is the transmission source of the transport request information, of contract establishment (see also step 120 in FIG. 2). As a result, in the individual contractor operation terminals 34 and the orderer terminal 32, notification processing of notification of the establishment of the contract is performed (see also steps 122, 124, and 126 in FIG. 2).

Subsequently, the server 46 transmits information requesting execution of the first task (the remote operation task 1 in the example of (3) of FIG. 3) to the contractor operation terminal 34 operated by the contractor who undertakes the task (see also step 128 in FIG. 2). Thereby, the contractor who undertakes the first task executes the undertaken task by, for example, operating the remote driving operation unit 38 to cause the vehicle to travel from point A to point B by remote driving (see also step 130 in FIG. 2). When the contracted task is completed, the contractor inputs a task end, whereby the contractor operation terminal 34 notifies the server 46 of the task end (see also step 132 in FIG. 2).

When notified of completion of the first task, the server 46 transmits information requesting execution of the second task (the remote operation task 2 in the example of (3) of FIG. 3) to the contractor operation terminal 34 operated by the contractor who undertakes the task (see also step 134 in FIG. 2). Thereby, the contractor who undertakes the second task executes the undertaken task by, for example, operating the remote driving operation unit 38 to cause the vehicle to travel from point B to point C by remote driving (see also step 136 in FIG. 2). When the contracted task is completed, the contractor inputs a task end, whereby the contractor operation terminal 34 notifies the server 46 of the task end (see also step 138 in FIG. 2).

The execution request of the task from the server 46 to the contractor operation terminal 34 is repeated until all the tasks are completed. In the example of (3) in FIG. 3, the third task is the safety confirmation task, and when notified of the end of the second task, the server 46 transmits information requesting execution of the third task (for example, the safety confirmation task) to the contractor operation terminal 34 operated by the contractor who undertakes the task.

Thus, the contractor who undertakes the third task waits at the point C, for example, until a recipient appears. When the recipient appears at the point C, after confirming the surroundings of the vehicle, the door or trunk of the vehicle is opened, and the contracted task is executed by handing over the object to the recipient. When the contracted task is completed, the contractor inputs a task end, whereby the contractor operation terminal 34 notifies the server 46 of the task end.

When all the tasks are completed, the server 46 notifies the individual contractor operation terminals 34 operated by the contractors who have executed the individual tasks this time, and the orderer terminal 32 which is the transmission source of the transport request information, of task completion (see also step 140 in FIG. 2). As a result, in the individual contractor operation terminals 34 and the orderer terminal 32, notification processing of notification of the completion of the tasks is performed (see also steps 142, 144, and 146 in FIG. 2).

Subsequently, the server 46 performs a settlement process of paying a reward to a plurality of contractors who have executed the tasks, using the payment from the orderer as funds (see also step 148 in FIG. 2). In other words, the server 46 performs a process of first withdrawing, from the account of the orderer, the consideration for the contractor who undertakes the task corresponding to the transportation request. Next, the server 46 performs a process of transferring a reward for each contractor to the account of each contractor that has executed the task. Then, the server 46 sends information notifying the individual contractor operation terminals 34 operated by the contractors that have executed the individual tasks this time, and the orderer terminal 32 that is the transmission source of the transportation request information, of the results of the settlement processing. As a result, in the individual contractor operation terminals 34 and the orderer terminal 32, processing that displays the results of the settlement processing is performed (see also steps 150, 152, and 154 in FIG. 2).

As described above, in the present embodiment, the server 46 receives, from the orderer terminal 32, a transport request for transporting the target person or the target object to the destination by the vehicle traveling by remote driving and delivering the target person or the target object to the recipient. Further, the task corresponding to the recognized transportation request is divided into a remote driving task for driving the vehicle by remote driving, and a safety check task including checking the periphery of the vehicle when the target person or the target object is delivered to the recipient at the destination. Then, the information of the remote operation task is transmitted to the contractor operation terminal 34 of the contractor who undertakes the remote operation task, and the information of the safety confirmation task is transmitted to the contractor operation terminal 34 of the contractor who undertakes the safety confirmation task. Thereby, the possibility that the safety confirmation task is executed by the second contractor can be improved, so that the possibility that the transport request from the orderer will not be satisfied can be reduced.

It is also conceivable that some task contractors would like to undertake both remote driving tasks and safety confirmation tasks, and others would like to undertake only safety confirmation tasks. By dividing the task corresponding to the transportation request into the remote operation task and the safety confirmation task, it is possible to improve the possibility that a contractor (described below) will undertake the safety confirmation task.

In the present embodiment, a reward for the first contractor and a reward for the second contractor are set so that the reward for the second contractor who undertakes the safety confirmation task is higher, and the set reward is transmitted to the first terminal and the second terminal. Thereby, the possibility that the safety confirmation task is executed by the second contractor can be further improved.

In the present embodiment, when the required time of the remote driving task is equal to or longer than a predetermined time, or when the traveling distance of the remote driving task is equal to or longer than a predetermined distance, the remote driving task is divided into a plurality of tasks. Thereby, the possibility that the remote driving task is executed by the first contractor can be improved.

In the above description, as an example of the task corresponding to the transport request, the task of transporting the target by the vehicle and delivering the target to the recipient at the destination has been described. However, the task corresponding to the transportation request is not limited to this, and may be a task of transporting the target person by vehicle and handing over the target person to the recipient at the destination.

In the above description, an aspect has been explained in which the task corresponding to the transportation request is divided into a plurality of tasks, and the execution of the tasks is requested after the contractors have been decided for all the divided tasks. However, the aspect is not limited to this. Instead of the above, when the contractor is decided for at least the first task among the divided tasks, the execution of the first task may be requested, and in parallel with the execution of the first task, the contractor may be decided for the tasks for which the contractor is not yet decided.

Further, the client-server type configuration has been described as an example of the transport request processing system 10, but the present invention is not limited to this. For example, a configuration may be adopted that realizes the processing of the present disclosure by omitting the server 46 and having the orderer terminal 32 and the contractor operation terminal 34 perform peer-to-peer communication. In this case, the orderer terminal 32 and the contractor operation terminal 34 function as the transport request processing device according to the present disclosure.

What is claimed is:

1. A transportation request processing system comprising:
   (A) a vehicle having a communication interface configured to communicate with an external network, and a drive control electronic control unit configured to enable remote driving of the vehicle by controlling actuators of the vehicle in response to remote driving commands received via the external network from a remote driver;
   (B) a transportation request processing device having:
      a data transmitter-receiver unit that communicates with the external network;
      a memory; and
      a processor coupled to the memory, and configured to:
         receive, using the transmitter-receiver unit, a transportation request to transport a target person or a target object from a starting point to a destination by the vehicle traveling by remote driving and to deliver the target person or the target object to a recipient at the destination, the transportation request being received from a terminal of an orderer,
         divide a task corresponding to the transportation request into a remote driving task of causing the vehicle to travel by remote driving, and a safety check task of checking a periphery of the vehicle that has arrived at the destination and delivering the target person or the target object from the vehicle that has arrived at the destination to the recipient at the destination, the safety check task being performed without driving any vehicle, and
         using the data transmitter-receiver unit, (i) transmit the remote driving task and the safety check task to a plurality of terminals of a plurality of different contractors, (ii) receive a response from at least a first terminal of a first contractor indicating that the first contractor has selected to undertake the remote driving task, (iii) transmit, to the terminal of the orderer and the first terminal, an indication that at least part of the transportation request has been undertaken, and (iv) transmit a request to execute the remote driving task to the first terminal; and
   (C) the first terminal of the first contractor who operates as the remote driver, the first terminal having a remote driving operation unit configured to receive remote driving operations of the remote driver who remotely drives the vehicle and transmit the remote driving commands to the vehicle via the external network,
   wherein the processor, in parallel with execution of the remote driving task, determines a second contractor, who is different from the first contractor, to undertake the safety check task, and transmits information of the safety check task to a second terminal of the second contractor using the data transmitter-receiver unit.

2. The transportation request processing system recited in claim 1, wherein the processor of the transportation request processing device is further configured to:
   set a first reward for the first contractor and set a second reward for the second contractor such that the second reward for the second contractor who will undertake the safety check task is higher than the first reward for the first contractor; and
   transmit, using the transmitter-receiver unit, the set first reward to the first terminal and the set second reward to the second terminal.

3. The transportation request processing system recited in claim 1, wherein the processor of the transportation request processing device is further configured to divide the remote driving task into a plurality of tasks in a case in which a required time for the remote driving task is equal to or longer than a predetermined time, or in a case in which a travel distance of the remote driving task is equal to or longer than a predetermined distance.

4. A method of controlling a vehicle having a communication interface configured to communicate with an external network, and a drive control electronic control unit configured to enable remote driving of the vehicle by controlling actuators of the vehicle in response to remote driving commands received via the external network from a remote driver, the method comprising:
   processing a transportation request by a computer-processor by:
      receiving, from a terminal of an orderer, a transportation request to transport a target person or a target object from a starting point to a destination by the vehicle traveling by remote driving and to deliver the target person or the target object to a recipient at the destination;
      dividing a task corresponding to the transportation request into a remote driving task of causing the vehicle to travel by remote driving, and a safety check task of checking a periphery of the vehicle that has arrived at the destination and delivering the target person or the target object from the vehicle that has arrived at the destination to the recipient at the destination, the safety check task being performed without driving any vehicle; and
(i) transmitting the remote driving task and the safety check task to a plurality of terminals of a plurality of different contractors, (ii) receiving a response from at least a first terminal of a first contractor indicating that the first contractor has selected to undertake the remote driving task, (iii) transmitting, to the terminal of the orderer and the first terminal, an indication that at least part of the transportation request has been undertaken, and (iv) transmitting a request to execute the remote driving task to the first terminal; and controlling the vehicle with the first terminal of the first contractor who operates as the remote driver, the first terminal having a remote driving operation unit configured to receive remote driving operations of the remote driver who remotely drives the vehicle and transmit the remote driving commands to the vehicle via the external network, wherein the processing performed by the computer-processor further comprises:
in parallel with execution of the remote driving task, determining a second contractor, who is different from the first contractor, to undertake the safety check task, and transmitting information of the safety check task to a second terminal of the second contractor.

5. The method recited in claim 4, further comprising the computer-processor:
setting a first reward for the first contractor and setting a second reward for the second contractor such that the second reward for the second contractor who will undertake the safety check task is higher than the first reward for the first contractor; and
transmitting the set first reward to the first terminal and the set second reward to the second terminal.

6. The method recited in claim 4, further comprising the computer-processor dividing the remote driving task into a plurality of tasks in a case in which a required time for the remote driving task is equal to or longer than a predetermined time, or in a case in which a travel distance of the remote driving task is equal to or longer than a predetermined distance.

7. A non-transitory recording medium storing a program that causes a computer to execute transportation request processing to control a vehicle having a communication interface configured to communicate with an external network, and a drive control electronic control unit configured to enable remote driving of the vehicle by controlling actuators of the vehicle in response to remote driving commands received via the external network from a remote driver, the transportation request processing comprising:
receiving, from a terminal of an orderer, a transportation request to transport a target person or a target object from a starting point to a destination by the vehicle traveling by remote driving and to deliver the target person or the target object to a recipient at the destination;
dividing a task corresponding to the transportation request into a remote driving task of causing the vehicle to travel by remote driving, and a safety check task of checking a periphery of the vehicle that has arrived at the destination and delivering the target person or the target object from the vehicle that has arrived at the destination to the recipient at the destination, the safety check task being performed without driving any vehicle; and
(i) transmitting the remote driving task and the safety check task to a plurality of terminals of a plurality of different contractors, (ii) receiving a response from at least a first terminal of a first contractor indicating that the first contractor has selected to undertake the remote driving task, (iii) transmitting, to the terminal of the orderer and the first terminal, an indication that at least part of the transportation request has been undertaken, and (iv) transmitting a request to execute the remote driving task to the first terminal, and
wherein the vehicle is controlled by the first terminal of the first contractor who operates as the remote driver, the first terminal having a remote driving operation unit configured to receive remote driving operations of the remote driver who remotely drives the vehicle and transmit the remote driving commands to the vehicle via the external network, wherein
the transportation request processing further comprises:
in parallel with execution of the remote driving task, determining a second contractor, who is different from the first contractor, to undertake the safety check task, and transmitting information of the safety check task to a second terminal of the second contractor.

8. The non-transitory recording medium recited in claim 7, wherein the transportation request processing further comprises:
setting a first reward for the first contractor and setting a second reward for the second contractor such that the second reward for the second contractor who will undertake the safety check task is higher than the first reward for the first contractor; and
transmitting the set first reward to the first terminal and the set second reward to the second terminal.

9. The non-transitory recording medium recited in claim 7, wherein the transportation request processing further comprises dividing the remote driving task into a plurality of tasks in a case in which a required time for the remote driving task is equal to or longer than a predetermined time, or in a case in which a travel distance of the remote driving task is equal to or longer than a predetermined distance.

10. The transportation request processing device recited in claim 2, wherein the processor of the transportation request processing device:
sets the second reward to a standard reward amount plus a predetermined amount, and sets the first reward to the standard reward amount minus the predetermined amount divided by a number of the contractors that perform the remote driving task.

11. The transportation request processing method recited in claim 5, wherein the computer-processor:
sets the second reward to a standard reward amount plus a predetermined amount, and sets the first reward to the standard reward amount minus the predetermined amount divided by a number of the contractors that perform the remote driving task.

12. The non-transitory recording medium recited in claim 8, wherein the transportation request processing:
sets the second reward to a standard reward amount plus a predetermined amount, and sets the first reward to the standard reward amount minus the predetermined amount divided by a number of the contractors that perform the remote driving task.

* * * * *